United States Patent [19]
Putnam

[11] Patent Number: 5,917,482
[45] Date of Patent: Jun. 29, 1999

[54] DATA SYNCHRONIZING SYSTEM FOR MULTIPLE MEMORY ARRAY PROCESSING FIELD ORGANIZED DATA

[75] Inventor: Leland K. Putnam, Salt Lake City, Utah

[73] Assignee: Philips Electronics N.A. Corporation, New York, N.Y.

[21] Appl. No.: 08/616,950

[22] Filed: Mar. 18, 1996

[51] Int. Cl.⁶ .................................................. H04N 5/04
[52] U.S. Cl. ........................ 345/328; 348/500; 348/515; 348/845.3; 395/551
[58] Field of Search ................................ 348/515, 7, 10, 348/12, 13, 500, 512, 513, 384, 388, 390, 391, 394, 395, 417, 418, 420, 422, 845.3; 345/327, 328; 395/551

[56] References Cited

U.S. PATENT DOCUMENTS

| | | | |
|---|---|---|---|
| 5,559,999 | 9/1996 | Maturi et al. | 395/550 |
| 5,642,171 | 6/1997 | Baumgartner et al. | 348/515 |
| 5,751,280 | 5/1998 | Abbott et al. | 345/302 |

*Primary Examiner*—David E. Harvey
*Attorney, Agent, or Firm*—Michael E. Belk

[57] ABSTRACT

A data system includes a memory array operative together with a memory controller and a processor. The processor includes a control input which receives user commands. A plurality of data channels are provided for output and input of independent data streams from and to the memory array. A field rate clock provides field rate clock signals to the data channels. In several embodiments, each data channel includes a data stream synchronization system which includes a data queue for receiving a succession of data fields within the data channel and an ideal queue tightly coupled to and operatively associated with each data queue to provide a correct field reference for use in synchronizing the data queue. In an alternate embodiment, a plurality of data queues are tightly coupled to a common ideal queue. The system control apparatus is operative upon the common ideal queue or the ideal queues within each data channel to control the sequence of fields therein. Each data queue within each channel responds to and follows its associated ideal queue in the creation of its input data field.

25 Claims, 3 Drawing Sheets

DATA SYNCHRONIZING SYSTEM FOR MULTIPLE MEMORY ARRAY PROCESSING FIELD ORGANIZED DATA

BACKGROUND OF THE INVENTION

1. Field of the Invention

This invention relates generally to multiple memory array devices and particularly to those utilizing arrays of memories storing and retrieving field organized data.

2. Description of the Related Art

Early video systems serving multiple viewers were, in essence, continuously running "play" systems in which viewers received the program material on television receivers in accordance with the video providers established schedule. The program material was typically stored upon video tape or some other similar storage medium and was simply played across the system.

With the development of large capacity randomly accessible memory systems such as disk drive memories, so-called video-on-demand systems became realizable. In video-on-demand systems, a substantial improvement was provided in that each viewer became able to receive individually selected program material to be played at the viewer's chosen time. Systems for providing video-on-demand are generally referred to as video servers and typically include large arrays of disk drive memories operative under the control of one or more disk controllers.

As the capabilities of video servers have improved, it has become possible to provide improved video-on-demand systems which are viewer accessible. This quality of viewer accessibility allows the viewer to control not only the selected time of program material play but also facilitates functions such as "fast forward", "reverse", "slow speed" and "freeze frame". While providing such viewer access and control is extremely desirable to the viewer, it often creates problems for the video server due in part to the nature of television program information and the operational characteristics of multiple disk drive memory systems.

Program material provided for television viewing must of necessity be formatted in accordance with television display operation. For the most part, television program material represents a combination of several different forms of data such as video data, audio data, and various synchronizing information such as time code data. For proper display and use, the several forms of data within program material must be organized in accordance with a television field rate format.

In multiple disk drive video servers, data is stored on various disk drives within the system as portions of the different data types. For correct play upon the viewer's television receiver, the data for each field of program material must be retrieved from the various disk drive memories and provided to the viewer as an appropriately timed series of complete data fields. In essence, each data field comprising the various types of data must be assembled as a complete data field within the video server prior to its output to the viewer.

Television program material, due to its field organization and different data types, represents an excellent example of an environment within which the present invention is advantageous. However, it will be apparent from the description below that other environments using different data formats may benefit from the present invention as well. For example, many other forms of data such as computer text and graphics information are often transferred in a field organized format and often include different types of data components.

Unlike early systems using tape memories in which the different types of data for each successive data field is maintained in proper timing and association by physical location upon the tape, systems using complex memories such as multiple disk drive arrays must accomplish the retrieval of each type of data from the various system disk drives and construct or assemble each data field in time for its output in accordance with the program material field sequence. Because different types of data within a given field of data are retrieved and moved through the system at different speeds, direct transfer from the memory array to the output system is not practical. Thus, in a practical system, successive fields of data are usually assembled in a field queue to provide time for the formation of an appropriate sequence of completed data fields. Thereafter, the data fields are progressively outputted from the field queue to the system output for the user.

In most systems, the use of a data queue allows the succession of data fields to be completed and assembled in time for output so long as the system operates in a normal play mode. In the event, however, that the viewer demands a change of program material flow such as fast forward or reverse, the differing retrieval rates and transfer rates of the various data types cause data of different types to slip or be displaced relative to each other as the system attempts to rapidly alter the field sequence and assemble the succession of data fields within the field queue. As a result, the different types of data are not reliably added to the correct field and the data types within the data fields become "scrambled" and are no longer synchronized. This, is in turn, results in a series of incomplete or incorrect fields of data being progressively moved through the data queue to the display system.

Once the viewer returns the system to a normal play or viewing rate following a different mode such as fast forward, the viewer expects to observe a properly displayed program. However, the series of incomplete or improperly synchronized data fields within the data queue cannot be corrected in time for display. The result is the display of an interval of scrambled program material as the system struggles to restore synchronized data output. Similar problems are encountered in response to viewer demands for other changes of server operation which disturb the normal play sequence such as slow-speed or freeze-frame. The often lengthy interval of scrambled program material provided to the viewer as the system attempts to restore data synchronization following a rate change has been found to be extremely objectionable. In many instances, it significantly diminishes the viewer's enjoyment of the program material and reduces the appeal of interactive access.

The above-described problems of data synchronization within field organized data systems are not confined to the data output process of memory array systems such as video servers described above. On the contrary, the opposite process of inputting field organized data such as television program material into a multiple memory array for storage encounters similar data synchronization problems. Because data such as program material or other field organized data is typically not supplied to the memory array system at a steady field rate, fields of data are usually assembled in data queues within the input channels of memory arrays in a similar process to that utilized in the various output channels. In fact, the input channels of systems using such memory arrays often receive intermittent high-rate bursts of data separated in time. This necessitates the organization and accumulation of field rate data within the input data queues of the system. As with the data output process, input data is subject to different transfer and accumulation speeds within the system. As a result, the above-described problems of loss of data synchronization or slip between different data types occurs and causes corresponding problems for the input channels of the memory array. Consequently, systems which process field organized data such as video servers or the like often encounter data synchronization problems during the data input or storage process as well as the data retrieval or output process.

In view of the overwhelming desire in the art to provide interactive viewer access to data systems such as video servers, there arises a continuing need in the art for improved data systems which maintain proper data synchronization of multiple-type field-organized data despite field rate changes. A particularly acute need exists in the art of video servers for systems which are able to maintain the display of properly synchronized data to the viewer following field rate changes and reversals.

SUMMARY OF THE INVENTION

Accordingly, it is a general object of the present invention to provide an improved field organized data synchronizing system which improves both data input and output. It is a more particular object of the present invention to provide an improved data synchronizing system for use in multiple memory array video servers processing field organized data. It is a still more particular object of the present invention to provide an improved data synchronizing system which maintains proper timing and synchronization between various types of data in a field organized system despite changes or reversals of field display rate.

The present invention system recognizes the need to provide a reliable reference for assembling data within the data queue of a data system such as a video server during both input and output operations which is maintained despite multiple data burst input changes as well as changes or reversals of field rate during data output in response to viewer inputs or commands. The present invention system utilizes a data queue within the input and output data channels for each data type. Each data queue is clocked in accordance with the field rate. Thus, a typical system has one or more input and output data queues for video data, audio data, time code data and so on. The required data for each field within each data channel is assembled within the data queue and clocked toward the data queue output at the field rate.

In accordance with an important aspect of the present invention, one or more field organized ideal queues are provided which are tightly coupled to the data queues of the data channels. In the most direct embodiment of the present invention, a single ideal queue is provided which is commonly coupled to each of the data queues. For greater system flexibility, however, individual ideal queues are provided within each data channel. Thus, in systems having plural ideal queues, each data channel includes a data queue for assembling fields of data and a tightly coupled ideal queue. The important characteristic of the ideal queues is that they are not encumbered by the data assembly process and, as a result, their field sequences are always correct. The ideal queue in a single ideal queue system or the queues within each data channel in a plural ideal queue system store field rate and position information for each field. The ideal queue or queues are clocked at the field rate and respond to the system processor to implement the field rate and field sequence needed by the system. For data output channels, the field rate and sequence is formed in response to commands of the viewer. For data input channels, the processor control sets the field rate. In either input or output channels, the ideal queue or queues form a progression of "idealized" fields. The system processor selects each input field of each data queue to correspond directly to the input field of the associated ideal queue. As a result, the ideal queue or queues provide references for field synchronization of the various data queues. Synchronization is maintained at the input field of each data queue through its correspondence to its associated ideal queue.

In essence, the processor receives user inputs or other system field rate information and controls the field sequence within each ideal queue to maintain a field reference for each data queue. Correspondingly, the processor causes the input field data for each data queue to be applied to the data queues in direct correspondence to the input queue of its associated ideal queue. In this manner, the system is able to follow wide variations of field rate and other user input commands while maintaining synchronization of data between the various data channels. Because the data queues in each data channel are, in effect, being continuously synchronized to the references provided by their respective ideal queue, the above-described problems of scrambled information in response to frame rate changes or viewer inputs is greatly minimized and usually avoided.

Thus, the present invention a data stream synchronizing system for use in processing a data stream organized into a plurality of fields, the data stream synchronizing system comprising: a clock for providing field incrementing clock signals; an ideal queue for forming a first succession of first data fields by repetitively creating a first input data field and incrementally advancing each successively created first input data field through the ideal queue in response to each of the field incrementing clock signals; a data queue for forming a second succession of second data fields by repetitively creating a second input data field and incrementally advancing each successively created second data field through the data queue, each of the second input data fields being created in direct correspondence to a concurrent one of the first input data fields and each of the second input data fields having data received or assembled therein during the incremental advancing; and memory means for storing the data received in the second input data fields or retrieving the data assembled in said second input fields.

The present invention further provides a method of synchronizing a data stream organized into a plurality of data fields, the method comprising the steps of: providing periodic field clock signals; forming a plurality of ideal data fields by repetitively creating an ideal data field in response to each of the field clock signals; incrementally advancing each successively created ideal data field through an ideal queue in response to each of the field clock signals to form a succession of ideal data fields; forming a plurality of data queue data fields, each data queue data field being formed in direct correspondence to the creation of a concurrent one of the ideal queue data fields; incrementally advancing the data queue data fields through data queue in response to the field clock signals; and receiving or assembling selected portions of the data stream within the data queue data fields as the data queue data fields are incrementally advanced through the data queue.

The present invention further provides a data stream synchronization system for use in processing a field-organized data stream in response to a control signal, the data synchronization system comprising: a source of a field clock signal; an ideal queue for creating a succession of input ideal data fields selected in response to the control signal which are incremented through the ideal queue in response to the field clock signals; and a data queue for receiving or assembling a succession of data fields from the data stream in which an input data field is created in the data queue in direct correspondence to the simultaneously created one of the input ideal data fields.

The present invention further provides a data synchronizing system for synchronizing a data stream organized into a plurality of data fields, comprising: means for providing periodic field clock signals; means for creating a plurality of ideal data queue fields by creating an ideal queue data field in response to each of the field clock signals; means for forming an ideal queue by incrementally advancing the ideal queue data fields in response to the field clock signals; means for creating a plurality of data queue data fields, each of the data queue data fields corresponding to a concurrent one of the ideal queue data fields formed in the means for creating an ideal queue data field; means for forming a data queue by incrementally advancing the data queue data fields in response to the field clock signals; and means for receiving or assembling selected portions of the data stream within each of the data queue data fields as the data queue is incremented.

The present invention further provides a method for synchronizing a data stream for use in processing a data stream organized into a plurality of fields, the method comprising the steps of: receiving field incrementing clock signals; repetitively creating a first input data field and incrementally advancing each successively created first input data field through an ideal queue in response to each of the field incrementing clock signals; repetitively creating a second input data field and incrementally advancing each successively created second input data field through a data queue to form a second succession of second data fields each having received or assembled data therein, each of the second input data fields being created in direct correspondence to the first input data fields; and storing the received data in or retrieving the assembled data from a memory means.

The present invention further provides a method for synchronizing a data stream for use in processing a field-organized data stream in response to a control signal, the method comprising the steps of: providing field clock signals; creating a succession of input ideal data fields in response to the field clock signals, each input ideal data field being selected in response to the control signal; and receiving or assembling a succession of input data fields from the data stream in which each input data field is created in direct correspondence to a simultaneously created one of the input ideal data fields.

BRIEF DESCRIPTION OF THE DRAWINGS

The invention, together with further objects and advantages thereof, may best be understood by reference to the following description taken in conjunction with the accompanying drawings, in the several figures of which like reference numerals identify like elements and in which.

DESCRIPTION OF THE PREFERRED EMBODIMENTS

Figure 1:
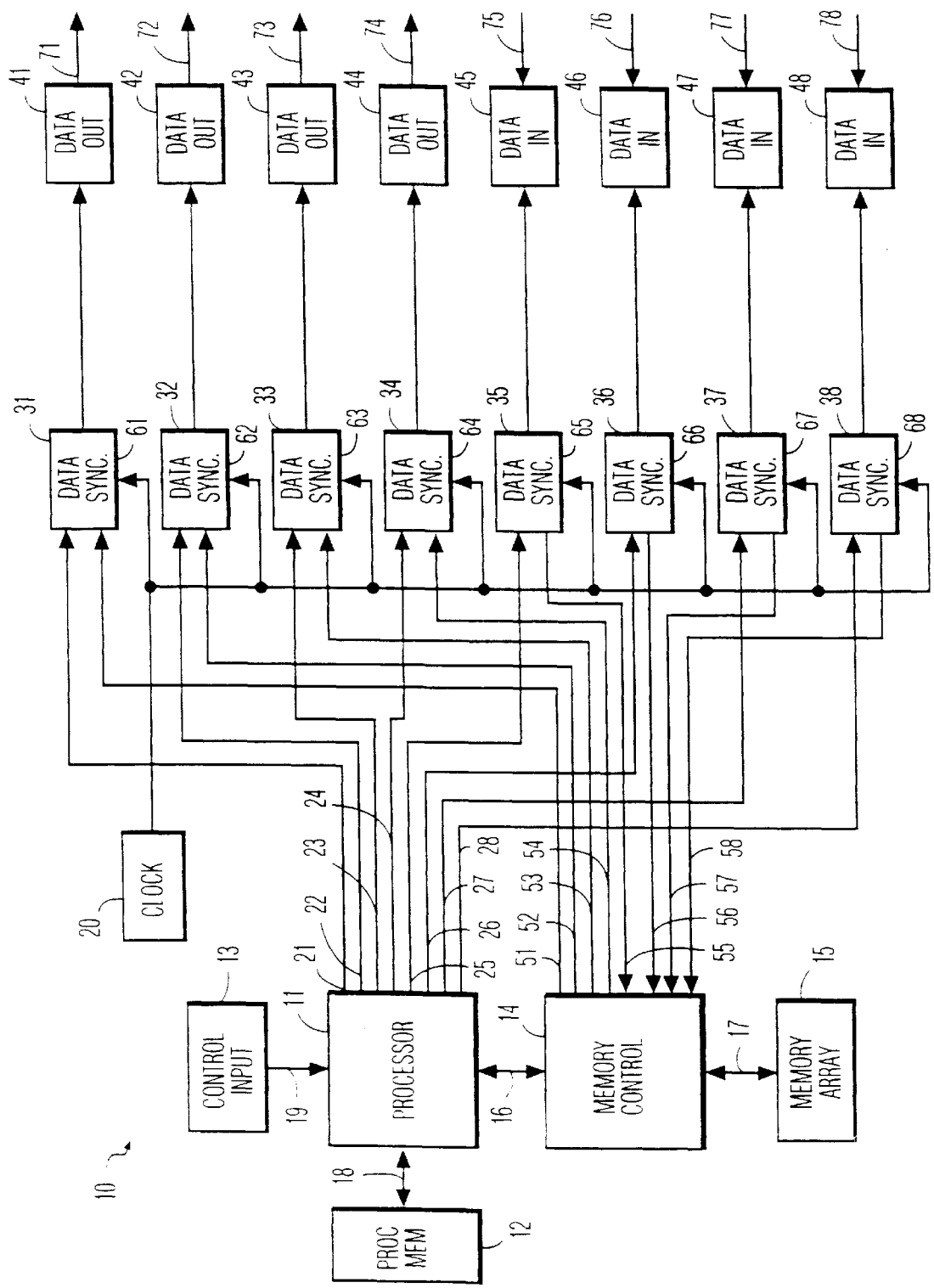
FIG. 1 sets forth a block diagram of the present invention data synchronizing system.

FIG. 1 sets forth a data system constructed in accordance with the present invention and generally referenced by numeral 10. Data system 10 includes a processor 11 having a processor memory 12 coupled thereto by a bidirectional communication 18. Processor 11 and processor memory 12 cooperate to provide operation of processor 11 in accordance with a stored program or instruction set within memory 12. A control input 13 is operatively coupled to processor 11 by a coupling 19. A memory array 15 is coupled to a memory control 14 by a bidirectional coupling 17. Memory control 14 in turn is coupled to processor 11 by a bidirectional coupling 16. Processor 11 further includes a plurality of outputs 21 through 28. Memory control 14 further includes a plurality of data outputs 51 through 54 and a plurality of data inputs 55 through 58.

System 10 further includes a plurality of data stream synchronizing systems 31 through 38. Data stream synchronizing systems 31 through 38 include respective clock inputs 61 through 68 commonly coupled to a data rate clock 20.

Data stream synchronization systems 31 through 34 are further coupled to a plurality of data output systems 41 through 44 respectively. Output systems 41 through 44 include data outputs 71 through 74 operatively coupled to a data utilization system (not shown). Data stream synchronization systems 35 through 38 are operatively coupled to a plurality of data input systems 45 through 48 respectively. Data input systems 45 through 48 include data inputs 75 through 78 respectively which in turn are coupled to a data source (not shown).

Control outputs 21 through 28 of processor 11 are operatively coupled to data stream synchronization systems 31 through 38 respectively to provide processor control of data stream synchronization systems 31 through 38 in the manner described below in greater detail. Data outputs 51 through 54 of memory control 14 are coupled to data stream synchronization systems 31 through 34 respectively while data inputs 55 through 58 of memory control 14 are operatively coupled to data stream synchronization systems 35 through 38 respectively.

In operation and by way of overview, data system 10 will be seen to include a memory array 15 which operates under the control of memory controller 14 which provides output data to four data output channels formed by data stream synchronization systems 31 through 34 and data output systems 41 through 44. The four data output channels provide data at outputs 71 through 74. The output data processed by data stream synchronization systems 31 through 34 is formatted into a plurality of successive data fields which are progressively moved through data stream synchronization systems 31 through 34 in response to data rate clock 20. Thereafter, the field organized output data is further processed by data output systems 41 through 44.

By way of further overview, data system 10 also includes four data input channels receiving data at inputs 75 through 78 of data input systems 45 through 48 respectively. Data synchronization systems 35 through 38 receive data from data inputs 45 through 48 which, in the manner described below, is also organized in accordance with a data field format and is clocked through data synchronization systems 35 through 38 to be applied to memory control 14 for storage within array 15. Thus, data system 10 will be seen to provide an exemplary data system fabricated in accordance with the present invention in which four types of data are each synchronized.

The present invention system is most advantageous in its operation when used in processing data organized and formatted to form a succession of data fields occurring in accordance with a regular and periodic field rate timing. For example, in the above-described television program format, successive fields of data comprise data which includes video data, audio data, and synchronizing or timing data all organized in a field formatted sequence. For compatibility in serving television users, the data field rate is usually selected to match the field scan rate for the anticipated television viewers. It will be apparent, however, other data processing systems may readily utilize other data formats having field rates which are substantially different than the field rates used in television systems. The important aspect of data processed with respect to the present invention is the organization of different data types into a format defining a plurality of successive regular data fields.

In the operation of system 10, it will be apparent that as mentioned above, system 10 is capable of operation in either an input or output mode. When operating in its output mode, system 10 provides a source of data formed by retrieving stored data within memory array 15 which is provided through four data channels to outputs 71 through 74 via data stream synchronization systems 31 through 34. Conversely, when functioning in an input mode, system 10 operates to provide storage of data supplied from outside the system through inputs 75 through 78 which is processed through four data channels formed by data inputs 45 through 48 and data stream synchronization systems 35 through 38 to be ultimately stored within memory array 15. In both the input and output modes of operation, it is a characteristic of the present invention system that different types of data are formed into data streams passing through individual data channels formed by the series combination of a data stream synchronization system and a data output system in being passed to or from memory array 15. In this process of individual data streams which are substantially independent apart from their common field organization, the independent data streams within each channel are maintained in proper synchronization with respect to the field organization of data to avoid and overcome the above-described problems of data slip or synchronization loss.

More specifically, when system 10 is operated in a data output mode such as that provided by a video server, the rate and direction of data output is controlled in response to user inputs via control input 13 to processor 11. Assuming the operation of data system 10 as a video server, the user may, for example, actuate control input 13 to communicate a request to operate system 10 in a normal play mode. The normal play mode is characterized by the continuous retrieval of data from memory array 15 and the assembly of data for successive data fields in order to supply complete data fields for each data channel at outputs 71 through 74 at the field rate. By means set forth below in greater detail and in accordance with an important aspect of the present invention, processor 11 controls data stream synchronization systems 31 through 34 as well as memory control 14 to provide the retrieval of data from memory array 15 and assembly of each field of data in the play sequence. In further accordance with the present invention, data stream synchronization systems 31 through 34 accumulate retrieved data within the appropriate sequence of data fields which is sequentially clocked from each of the data stream synchronization systems in accordance with clock 20 to be further processed by data output systems 41 through 44 as successive data fields.

In the event that the user desires output data which is being supplied at a rate different from the frame rate, the user provides a corresponding input command through control input 13 to processor 11. If, for example, the user desires to move data more quickly in a "fast forward" mode of operation, processor 11 responds to control input 13 to alter the succession of data fields assembled within data stream synchronization systems 31 through 34. In addition, processor 11 communicates with memory control 14 to facilitate retrieval of the corresponding data from memory array 15 which is needed within data stream synchronization systems 31 through 34 to properly assemble the altered sequence of data fields. If the above-mentioned example of operation of data system 10 as a video server is continued, the increased speed or fast forward operation is implemented within data stream synchronization systems 31 through 34 in a manner appropriate for the type of information being processed. Thus, for example, assuming data stream synchronization system 31 processes video data and that data stream synchronization systems 32 and 33 process audio data leaving data stream synchronization system 31 to process time code or synchronization data, each synchronization system may operate differently to achieve the fast forward operation. The fast forward operation for video data is achieved by dropping or skipping the required number of data fields to meet the fast forward field rate. If a fast forward of ten times the normal field rate is required, the video channel retrieves data and assembles every tenth data field while dropping or skipping intervening fields. In contrast, fast forward operation in audio data channels, such as data stream synchronization systems 32 and 33 in the present example, is achieved by more complex techniques such as compressing the audio information or temporarily deleting the audio portion of the program material. The time code or synchronization information is processed in a manner similar to the video information.

Conversely, in the event the user desires to slow down the succession of data fields such as provided by slow motion operation of a video server, processor 11 responds to control input 13 to again alter the succession of data fields assembled within data stream synchronization systems 31 through 34. Continuing the above example of a video server, video data within data stream synchronization system 31 is provided at a slow motion or reduced speed by repeating each data field the required number of times to correspond to the slow motion field speed selected. If the user has selected a one-fifth slow motion speed, data stream synchronization system 31 outputs each assembled data field of video information to data output 41 for five successive field intervals. The processing of audio information within data stream synchronization systems 32 and 33 is more complex, however, requiring the stretching of audio data through the increased number of data fields and the insertion of silent fields. Alternatively, system 10 may be configured to delete the output of audio data during the slow motion play mode. The time code information processed within data stream synchronization system 34 is repeated for successive fields in a similar manner to that employed for video information by data stream synchronization system 31.

In accordance with an important aspect of the present invention and by the operation set forth below in greater detail, data stream synchronization systems 31 through 34 maintain the synchronization of different data types within each data channel despite these substantial changes of data field output as the user moves through the various speed modes such as normal play, fast forward, slow speed, stop, and reverse.

In the event system 10 is operated in an input or record mode, data stream synchronization systems 35 through 38 operate in virtually the same manner as described above for systems 31 through 34 in the play mode. Thus, different types of data are received at data input systems 45 through 48 through inputs 75 through 78 which are in turn applied to data stream synchronization systems 35 through 38.

In accordance with the above example of a video server, the data channel formed by data input system 45 and data stream synchronization system 35 processes video data while the channels formed by data input system 46 and data stream synchronization system 36 as well as data input system 47 and data stream synchronization 37 processes audio data. This leaves the channel formed by data input system 48 and data stream synchronization 38 for processing time code or synchronization data. Each of data stream synchronization systems 35 through 38 is coupled to memory array 15 through memory control 14. In accordance with the present invention and by means described below in greater detail, data stream synchronization systems 35 through 38 maintain the synchronization of input data within each data channel despite interruptions of data supplied or changes of data input rate caused for example by the operation of the data sources to which inputs 75 through 78 are coupled to receive data.

It will be apparent to those skilled in the art that data system 10 shown in FIG. 1 is provided for illustrative purposes and that the present invention system is not limited to any particular number of data channels. It will be equally apparent to those skilled in the art from the descriptions which follow that the present invention system may be operated in a data output system, a data input system, or a combination input and output system as shown in FIG. 1 in accordance with the user's choice. It will be further understood by those skilled in the art that while the descriptions set forth herein frequently utilize television program material and the operation of the present invention system as a video server for purposes of illustration, the present invention system is by no means limited to such use. On the contrary, virtually any type of data having an organization in which different data types are processed and in which synchronization of the different types of data with respect to base rate is required provides an advantageous environment for operation of the present invention system. It should be further noted that in the example of FIG. 1, a simplified video server example is utilized having a single video data channel, a pair of audio data channels, and a single time code data channel. In many systems, however, a greater number of data channels are utilized to provide an effective video server system.

Figure 2:
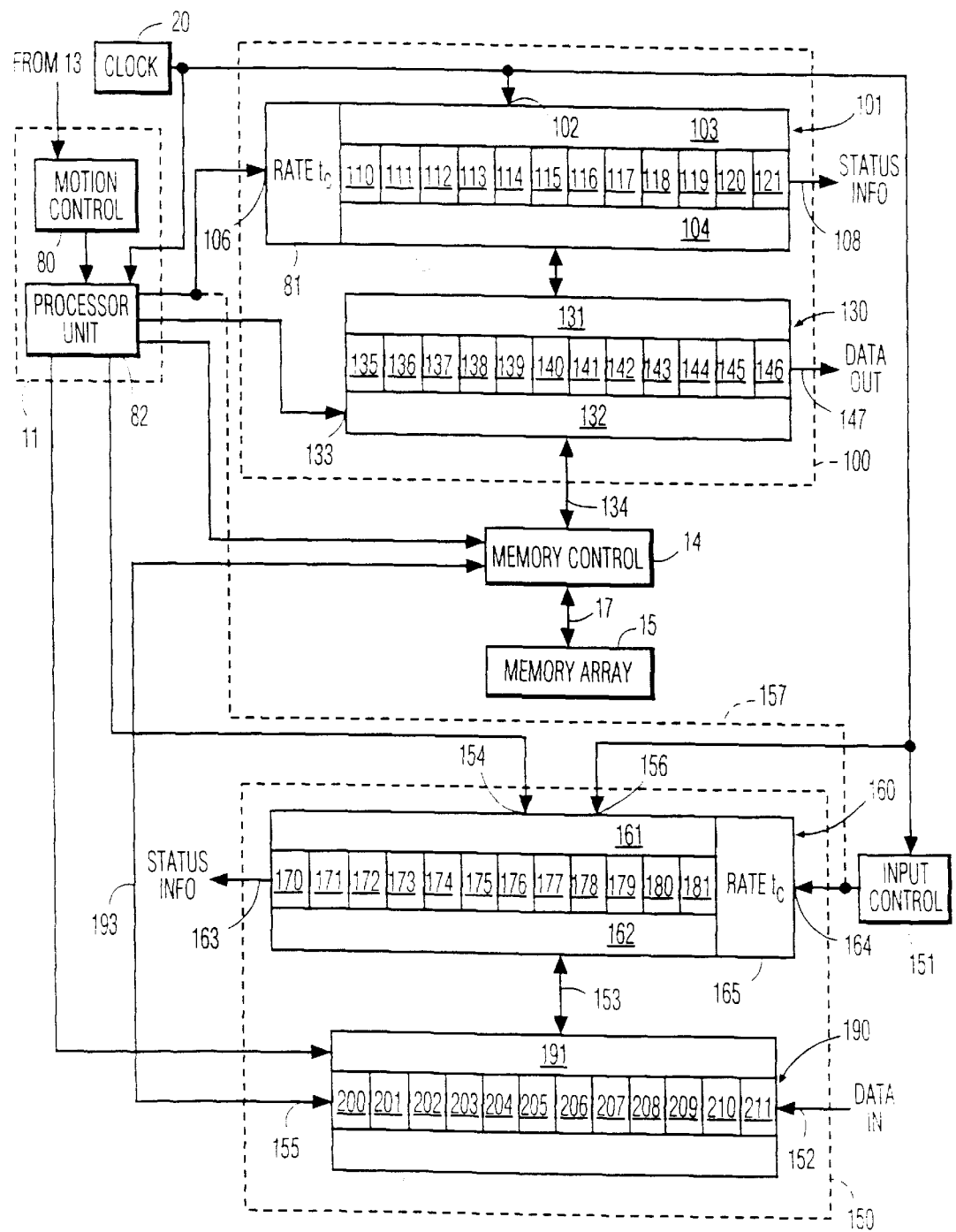
FIG. 2 sets forth a more detailed block diagram of the synchronizing portion of the present invention data synchronizing system.

FIG. 2 sets forth an illustrative block diagram of the present invention system with particular emphasis on the data stream synchronization system shown as elements 31 through 38 in the example of FIG. 1.

For purposes of illustration, FIG. 2 shows a data stream synchronization system 100 utilized within a data output channel together with a data stream synchronization system 150 utilized in a data input channel. It will be understood that data stream synchronization systems 100 and 150 are representative of data stream synchronization systems 31 through 38 shown in FIG. 1. Thus, for example, each of data stream synchronization systems 31 through 34 may be understood to correspond to data stream synchronization system 100 while each of data stream synchronization systems 35 through 38 in FIG. 1 may be understood to correspond to data stream synchronization system 150 in FIG. 2.

In accordance with the present invention, data stream synchronization system 100 includes an ideal queue 101 and a data queue 130 tightly coupled through a bidirectional coupling 107. Ideal queue 101 includes a clock interface 103 coupled at input 102 to clock 20. Clock 20, it should be recalled, is a field rate clock. Ideal queue 101 further includes an illustrative set of field queue slots 110 through 121. It should be noted that the selection of twelve field queue slots within ideal queue 101 is provided for purposes of illustration and, it will be recognized, that the present invention is not limited to any particular number of queue slots within ideal queue 101. Ideal queue 101 includes an interface 104 which provides coupling to bidirectional coupling 107. Ideal queue 101 also includes a rate and time code generator 81 tightly coupled to ideal queue 101. A motion control system 80 is coupled to control input 13 for user input (seen in FIG. 1) and is also coupled to a processor unit 82. If, for example, the system shown in FIG. 2 is part of a video server, viewer commands from control input 13 are converted to rate and time code information which processor unit 82 applies to rate and time code generator 81. Processor unit 82 comprises a portion of processor 11 shown in FIG. 1 and is operatively coupled to an input 106 of rate and time code generator 81. For purposes of the examples shown in FIGS. 1 and 2 of the present invention, a dashed-line 11 encloses processor unit 82 and motion control 80 to indicate the anticipated inclusion of these elements within the functions of processor 11 shown in FIG. 1. It should also be noted that processor unit 82 is coupled to clock 20.

In further accordance with the present invention, data stream synchronization system 100 further includes a data queue 130 having a plurality of field queue slots 135 through 146. Once again, it will be apparent that the number of data field slots within data queue 130 is not restricted to any particular number. For the operation of the present invention system, however, it is preferred that the number of field slots within data queue 130 corresponds to the number of field slots within ideal queue 101. Data queue 130 is tightly coupled to ideal queue 101 through interface 131 and coupling 107. In addition, data queue 130 includes an input 133 coupled to processor unit 82. Ideal queue 101 includes a status information output 108. Correspondingly, data queue 130 includes a data output 147 which comprises the output data point of data queue 130.

A memory control 14 is operatively coupled to interface 132 of data queue 130 by a bidirectional coupling 134. Memory control 14 is still further coupled to memory array 15 by a bidirectional coupling 17. Memory control 14 is further coupled to processor 82.

Data stream synchronization system 150 is substantially identical to data stream synchronization system 100 and is operative within a data input channel as mentioned above. Accordingly, data stream synchronization system 150 includes an ideal queue 160 having a rate and time code generator 165, an interface 161, a plurality of field slots 170 through 181, an interface 162, a control input 164 and a status information output 163. Data stream synchronization system 150 further includes a data queue 190 having a plurality of field slots 200 through 211 corresponding in number to the field slots of ideal queue 160. Data queue 190 includes an interface 191 coupled to ideal queue 160 by a tight bidirectional coupling 153. Data queue 190 also includes a data input 152 together with a data output 155. The latter is coupled to memory control 14. An input control 151 is coupled to input 164 of rate and time code generator 165. Processor unit 82 is operatively coupled to interface 191 of data queue 190. Clock 20 is further coupled to a clock input 156 of ideal queue 160 and to input control 151.

In operation and by way of overview, the operations of data stream synchronization system 100 operating in a data output channel and data stream synchronization system 150 operating in a data input channel are basically the same with respect to the present invention. In essence, the present invention maintains synchronization of data within the data queue of each channel by operating the ideal queue within the channel in response to the field clock signal together with the input field sequence to meet the field rate required in response to either viewer commands in the case of a data output channel or system data input requirements in the case of a data input channel. The ideal queue sets up the required sequence of fields within its successive queue slots which are incremented through the queue in response to the field clock signal. As operating speed requirements are changed, the sequence of fields within the ideal queue is correspondingly altered to maintain the ideal queue as a reference of correct field sequence responsive to input commands. The data queue within each channel in essence follows the ideal queue in setting up its sequence of fields within its queue slots. The data queue is constantly being synchronized to the ideal queue within the channel by inputting the corresponding input field of the ideal queue each time the opportunity to input a field is presented to the data queue. In the event synchronization is lost within the data channel, due for example to incomplete data retrieval for the data queue, the "re-synchronizing" is achieved by constantly inputting the next field into the data queue in correspondence to the input field of the ideal queue which rapidly restores data synchronization within the channel.

With the above overview in mind, the present invention system will now be described in greater detail. The present invention system operation will be initially described by considering the data output operation which passes through data stream synchronization system 100 afterwhich the system operation in a data input mode passing data through data synchronization system 150 will be discussed.

Assuming initially that the user desires to operate the present invention system in a normal speed or play mode, the user actuates control input 13 to apply a corresponding command to motion control 80. Motion control 80 in turn converts the user commands to rate and time code information. The rate and time code information communicates the field rate and field position sequence to ideal queue 101. The rate information includes a sign, either positive for forward sequence or negative for reverse sequence, together with a magnitude which is expressed as a multiplier of normal field rate. The multiplier may be either an integer, fraction or mixed number. The time code information includes a position pointer which indicates the starting field from which the system operates at the indicated rate. The position pointer identifies a given field within the data stream and is, in essence, the data stream location information of a field. Thus, in the example of normal play operation, the rate information is simply positive one. For purposes of illustration, it is assumed that the initial position is the first data field or position zero. The applied rate and time code information is then formatted by processor unit 82 and applied to rate and time code generator 81 of ideal queue 101. In the present example, rate and time code generator 81 sets the rate at positive one and position pointer at zero. Thereafter, the applied clock signal from clock 20 and the continuing rate and time code information maintains the rate at positive one and moves the position pointer to be incremented from zero to one, then one to two and so on as queue 101 is incremented at the field rate. As a result, each field within queue 101 moves toward output 108 one slot and a new input field is created in ideal queue 101 at each clock signal. This process continues as successive clock signals cause incremental field changes within ideal queue 101 and inputting of successive fields each having rate and time code information. Once ideal queue 101 is filled, the next clock signal from clock 20 causes the field information within slot 121 to be outputted as status information. Thereafter, so long as the system remains in a normal play mode, a succession of input fields each having a rate of positive one and successively increasing time code information (or position pointer) is created at slot 110 of ideal queue 101 and the field information of the output field slot (slot 121) is clocked out of ideal queue 101. Thus, at any given time, ideal queue 101 maintains the rate and time code information for twelve successive data fields including the next data field to be outputted and the current field to be inputted to the ideal queue.

In accordance with an important aspect of the present invention, data queue 130 is tightly controlled in response to ideal queue 101 via communication 107. Accordingly, as each data field is created at the input (slot 110) of ideal queue 101, the same data field is created at the input slot (slot 135) of data queue 130. The initial information provided at the input field for data queue 130 as the input field is created includes the field rate and time code information for each field. Thereafter, as successive clock signals increment ideal queue 101, data queue 130 creates corresponding input data fields within its input queue slot and increments the data fields through successive data slots in a similar process to that driving ideal queue 101. Unlike ideal queue 101, however, data queue 130 is sufficient in capacity to receive and hold the complete data for each field within each data field slot. Thus, as each data field is created within data queue 130 and incremented toward output 147, processor unit 82 operates data queue 130 and memory control 14 to implement the retrieval of the data for each field and the assembly of each field of data within each field as the fields of data queue 130 are incremented toward output 147.

Once a succession of twelve data fields have been created and incremented into data queue 130, the next increment of data fields within the data queue causes the output of one data field at output 147 together with the creation of the next new data field at input field slot 135. Under normal speed or play mode operation, data queue 130 remains in synchronism with ideal queue 101 due to the tight coupling between the ideal queue and data queue and the ability of memory control 14 and processor unit 82 to provide data retrieval from memory array 15 with sufficient speed to complete each data field in time for data output as required. This situation of synchronism between ideal queue 101 and data queue 130 continues so long as the system is capable of retrieving the complete data for each data field prior to its being outputted from output position 146 as a complete data field.

In the event that the user inputs a command which requires a mode of operation different from the normal speed or play mode, the viewer input command is received by motion control 80 and is applied to processor unit 82 which in turn applies rate and time code information to input 106 of rate and time code generator 81. At the next clock signal from clock 20, the altered rate and time code information in the form of a rate number (with sign) and a position pointer is inputted to field slot 110 of queue 101. If, for example, the user has changed from normal play to a fast forward mode having a rate ten times the normal field rate, the rate information within the field created in slot 110 is positive ten. Assuming further that this rate change to fast forward is to be initiated at field 100, the time code information (position pointer) within slot 110 of ideal queue 101 is 100. Thereafter, at the next clock signal, the newly created field is incremented to slot 111 and the next new field is created within slot 110 having a rate which continues to be positive ten and time code information having a position pointer of 110. At the next clock signal, each field increments to the right and the newest field created within slot 110 has a rate of positive ten and time code information of 120. In response to each clock signal, each field within slots 110 through 121 increments to the right allowing a new field to be created within slot 110. This process continues so long as the user continues to apply the fast forward ten times speed increase command to motion control 80. As a result, the sequence of fields within ideal queue 101 corresponds to every tenth field of data.

As mentioned above, data queue 130 creates a new field at input field slot 135 in direct correspondence to the current new field created within ideal queue 101 at slot 110 due to the tight coupling between the ideal queue and data queue. Thus, as ideal queue 101 responds to the altered rate and position information applied thereto to create the corresponding sequence of fields, data queue 130 creates a corresponding sequence of data fields. Each input field created within data queue 130 corresponds to the input field of ideal queue 101 and each created data field increments through data queue 130 in a synchronized manner. This synchronism remains so long as the required data to complete each data field is successfully retrieved-and assembled within data queue 130 prior to the time for outputting the data field. At high field rates, however, the situation frequently arises where a complete field of data cannot be retrieved and assembled within each data field prior to its output time. In accordance with conventional fabrication techniques, systems such as those utilizing the present invention data synchronizing system employ apparatus and/or software for preventing the output of an incomplete data field. In this case, the incrementing of data queue 130 ceases until a complete data field is assembled which can be outputted. Because the creation of each new data field at input slot 135 of data queue 130 requires an output of the data field within slot 146 and the incrementing of each field within data queue 130, the succession of data queue incrementing prevents the creation of each new data field within data queue 130. This in turn results in the loss of synchronism of data within the data channel and data queue 130 no longer corresponds to ideal queue 101.

In accordance with an important aspect of the present invention, it should be noted that despite the floundering of data queue 130, ideal queue 101 which is not encumbered by the data retrieval process continues to create data fields at the field rate and to increment the succession of correct data fields through the field positions. In other words, even though synchronization between ideal queue 101 and data queue 130 is temporarily lost, the operation of ideal queue 101 remains correct and a field reference queue is maintained which is used to resynchronize data queue 130 each time a new data field is created at its input.

During the time interval in which the retrieval and assembly of data for the fields within data queue 130 continues to lag the required field rate, the operation of data queue 130 continues, albeit out of synchronism. Data queue 130 is repeatedly synchronized to the ideal queue as each output field is completed and outputted by creating the next input data field at slot 135 of data queue 130 in direct correspondence to the current correct input field created at slot 110 of ideal queue 101. In this manner, two important operations are maintained. The first is the maintenance of a correct reference in the sequence of fields created within an incremented through ideal queue 101. The second is the resynchronizing action operative upon data queue 130 due to the creation of the input field within the data queue which corresponds to the input field of the reference field sequence within ideal queue 101.

Once the system is returned to a play mode or other slower speed operation which facilitates the timely retrieval and assembly of data within each field of the data queue, the resynchronization of the data queue is rapid due to the availability of the reference provided by ideal queue 101 and the periodic resynchronizing which was applied to each input field of data queue 130.

The operation of data stream synchronization system 100 in response to other changes of field speed such as fast, reverse or slow motion is operative in the above-described manner. As different rates and time code information are produced by motion control 80, processor unit 82 and rate and time code generator 81 in response to viewer commands, ideal queue 101 is able to establish the corresponding correct sequence of fields which data queue 130 then follows.

As mentioned above, the data stream synchronization systems of the present invention operative within the data input channels operate in substantially the same manner as those within the data output channels. Accordingly, it will be understood that the operation of data stream synchronization system 150 which processes input data is substantially the same as that described above for data stream synchronization 100. The primary exception to this similarity is the control of ideal queue 160 of data stream synchronization system 150 in response to input control 151 rather than motion control 80 as described above for ideal queue 101. It should be recalled that in a typical system within which the present invention is operative, input data intended to be stored within memory array 15 is usually provided in the form of real time data streams. However, it will be apparent that other input rates may be accommodated by the input channels. Thus, input data channels function to receive data fields from this data input source in order to properly transfer the field organized data to memory array 15. Accordingly, input control 151 is representative of the host system control of input data rather than the viewer control provided as control input 13 (seen in FIG. 1). However, the basic function is the same in that the input information to ideal queue 160 comprises rate and time code information.

In response to rate and time code information provided by input control 151 and rate and time code generator 165, ideal queue 160 creates a corresponding sequence of fields which are successively incremented in response to the clock signals from clock 20 at input 156. Data queue 190 follows the operation of ideal queue 160 in the manner described above in the operation of data queue 130 in response to ideal queue 101. Each data field created within data queue 190 corresponds to the current newly created field within ideal queue 160. Data fields within data queue 190 are successively incremented through the data queue toward output 155. The data received at input 152 is received within each appropriate data field as the data fields increment through data queue 190.

In the event a problem arises and data queue 190 is unable to receive a complete data field prior to output of the data field, the operation of data queue 190 loses synchronism with ideal queue 160. Despite this loss of synchronism, ideal queue 160 remains correct and each newly created data field at input slot 211 of data queue 190 corresponds to the current newly created data field at input slot 181 of ideal queue 160. Thus, data queue 190 is repeatedly resynchronized to ideal queue 160 during normal operation and each opportunity during periods of operation in which the synchronism of data queue 190 to ideal queue 160 is lost. This resynchronization at the input field of data queue 190 facilitates the rapid restoration of synchronization once the input data is again timely received within each data field of data queue 190.

FIG. 2 also sets forth an alternative embodiment of the present invention in which dashed-line coupling 157 couples rate and time code generator 165 of ideal queue 160 within data stream synchronization system 150 to the control input 106 of ideal queue 101. With this optional coupling in place, input control 151 is inactive and ideal queue 160 is operated in direct synchronism with ideal queue 101. Because of the above-described operation within data stream synchronization system 150, data queue 190 is synchronized to ideal queue 160 which in turn is controlled by rate and time code generator 81. In other words, with coupling 157 in place, ideal queues 101 and 160 operate in synchronism to form, in effect, a single common ideal queue. Data queues 130 and 190 are, as a result, operated in response to a common ideal queue. Since both ideal queues respond to user inputs through motion control 80 and rate and time code generator 81, the input and output data channels are synchronized and commonly controlled by the user inputs. One of the important advantages of this embodiment is the ability to provide real-time editing.

In order to perform real-time editing, a system such as a video system requires that the input material be properly synchronized to the material being played. In a typical scenario, the editor exercises some rapid movement through the material being played to reach the desired spot at which new material is to be inserted. By operating in this manner, the input data and output data are moved together in a maintained synchronism. Thus, at any given point in the data, the operator may insert new data from the input data channel in place of data in the output data channel. Thus, in accordance with the present invention, the common operation of ideal queues 101 and 106 within the output channels and input channels maintains this synchronization to facilitate the insertion of new data from the input channel as desired. As a result, the operator or editor is able to fast forward, reverse, or move forward more slowly than standard play speed in viewing and moving about through the to-be-edited material. Once the place within the material is located at which the editor desires to insert material, the input material is automatically synchronized to the various forward and reverse speed changes utilized by the editor and the input remains synchronized to the output data.

It will be apparent to those skilled in the art from the above-described operations of the present invention system that the use of individual ideal queues in association with each data queue provides substantial flexibility for system operation in that any combination of channels whether input or output may be synchronized to follow the user's input commands by simply tying or coupling the respective ideal queues of the channels together to form a "common ideal queue" which all data queues then follow. The flexibility provided by individual ideal queues for each data queue allows virtually any combination of channels to be synchronized facilitating multi-use machines or systems.

In the event, however, that the flexibility provided by individual ideal queues in association with each data queue is not needed within a given system, the system architecture of the present invention may be substantially simplified by providing a common ideal queue which is tightly coupled to each of the data queues within the system. In this arrangement, each data queue is associated with and follows the common ideal queue. The ideal queue is controlled in response to a data field clock and a processor operative to receive control inputs from the operator and determine the field sequence within the ideal queue in the manner described above in the system of FIG. 2.

Figure 3:
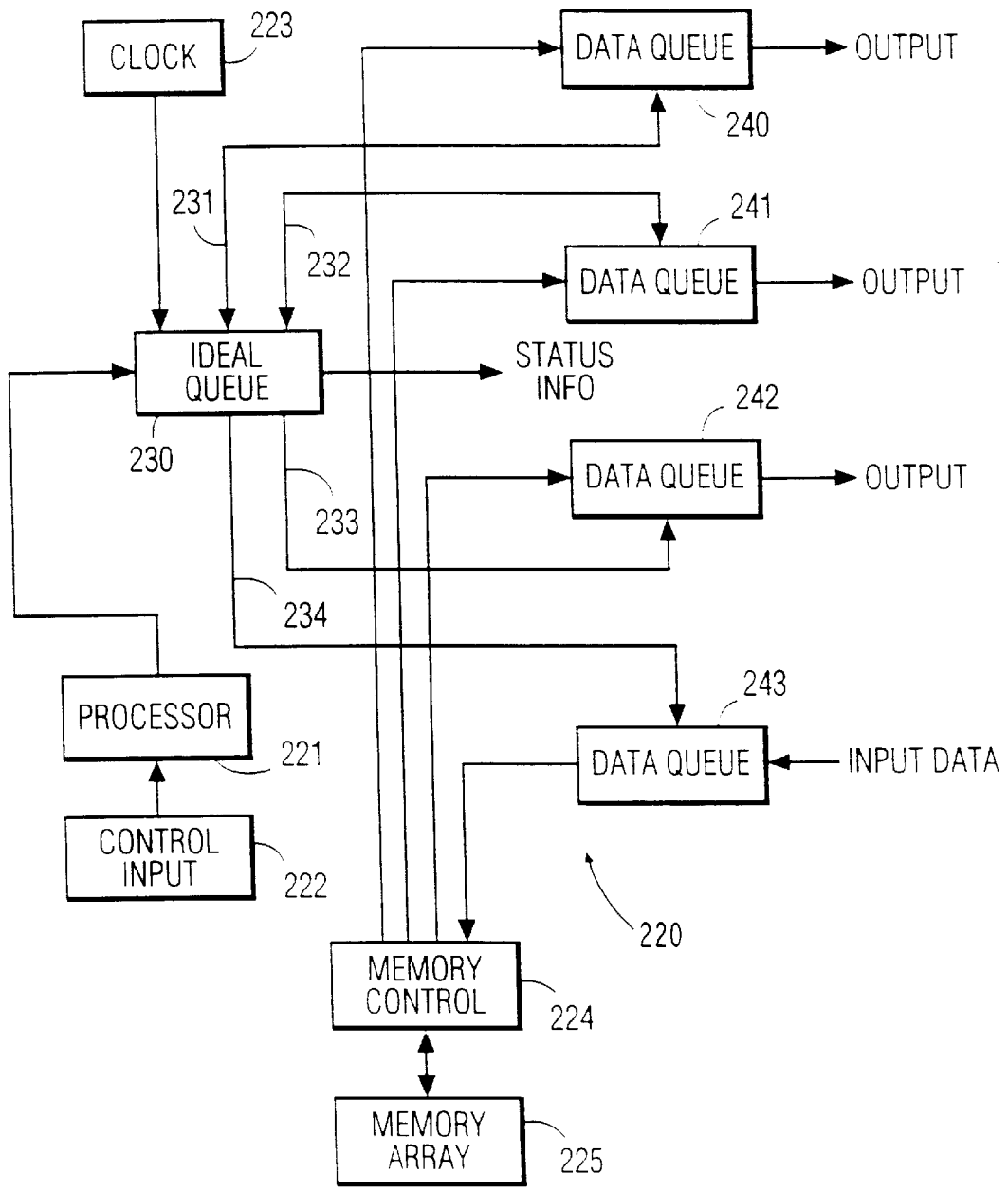
FIG. 3 sets forth a block diagram of an alternate embodiment of the present invention data synchronizing system.

FIG. 3 sets forth a block diagram of a simplified embodiment of the present invention data synchronizing system generally referenced by numeral 220. Data system 220 includes a plurality of data output channels having data queues 240, 241 and 242 therein. System 220 further includes an input channel having a data queue 243 utilized therein. A memory control 224 is coupled to the input sides of data queues 240, 241 and 242. Memory control 224 is also coupled to the output of data queue 243. Memory control 224 is operatively coupled to a memory array 225. The outputs of data queues 240, 241 and 242 are coupled to respective data output systems (not shown) in a manner similar to that shown in FIG. 1. Correspondingly, data queue 243 includes an input coupled to an input data source (not shown) also in a similar manner to that set forth above in FIG. 1.

In accordance with the present invention, an ideal queue 230 is tightly coupled to data queues 240 through 243 in the manner described above and as is particularly shown in FIG. 2. Ideal queue 230 includes an output coupled to a status information system (not shown) and an input coupled to processor 221. Processor 221 in turn is coupled to a control input 222. In addition, a field rate clock 223 is coupled to data queue 230.

In operation and by way of overview, data system 220 differs from data system 10 shown in FIG. 1 in that a plurality of data queues are operatively controlled and tightly coupled to a common ideal queue 230. In this manner, individual ideal queues for each of the data queues are not needed and the synchronization of each of the data queues to each other is assured. Thus, while data system 220 lacks the flexibility provided by the individual ideal queues within each channel of the embodiment shown in FIGS. 1 and 2, this lack of flexibility is compensated for by simplicity of system operation and lower cost. In this manner, the user is afforded the option of fabricating a system utilizing the present invention which is more cost effective and meets the user's operational needs.

Control input 222 provides user inputs such as play speed, fast forward, reverse, stop and so on to processor 221 which applies corresponding rate and time code information to ideal queue 230 in the manner set forth above in FIG. 2 and provided therein by processor unit 82, motion control 80 and rate and time code generator 81. In further similarity to the operation of the above-described embodiments, ideal queue 230 is incremented or clocked at the data field rate by a clock signal provided by clock 223.

Data queue 240 receives data to be assembled within each data field from memory array 225 via the operation of memory control 224 in the manner described above. In further correspondence to the above-described system, data queue 240 is tightly coupled to ideal queue 230 by a coupling 231. Thus, each input field created within data queue 240 is formed in correspondence to the current input field of ideal queue 230. In this manner, data queue 240 is repetitively resynchronized to ideal queue 230 in the above-described manner. Similarly, data queues 241 and 242 receive data to be assembled within respective data fields from memory control 224. In further similarity, each input data field created within data queues 241 and 242 corresponds directly to the input data field created within ideal queue 230. Data queues 241 and 242 are tightly coupled to ideal queue 230 by couplings 232 and 233 respectively. Because of the tight coupling between data queues 240 through 242 to ideal queue 230, each data queue is incremented to form successive data fields which are assembled and successively outputted from the data queues to the output portions of the system (not shown).

Data queue 243 is situated within an input channel and receives data from an input data source (not shown). Data queue 243 is also tightly coupled to ideal queue 230 by a coupling 234. The output of data queue 243 is coupled to memory array 225 via memory controller 224.

Because data queues 240 through 243 are each tightly coupled to ideal queue 230, the operations of the data queues are tightly synchronized to the operation of ideal queue 230. Ideal queue 230 is in turn controlled in response to user inputs leaving data queues 240 through 243 to "follow" ideal queue 230 in the manner described above. Because data queues 240 through 243 are commonly controlled in response to a common ideal queue, the mutual synchronization between each of the data queues is maintained despite substantial changes in field rate and changes in field sequence direction. In effect, data system 220 operates in the same manner as would be provided by system 10 shown in FIG. 1 if each of the individual ideal queues within each data channel are commonly coupled in the manner described above in FIG. 2 when ideal queues 101 and 160 are coupled by means of coupling 157.

It will be apparent to those skilled in the art that FIG. 3 is provided for illustrative purposes and the present invention embodiment set forth therein is by no means limited to the use of four data queues in combination with a single ideal queue. On the contrary, virtually any number of data queues may be tightly coupled to a common ideal queue to provide the operation illustrated in the system of FIG. 3. The essential aspect of the present invention embodiment shown in FIG. 3 is the provision of a tight coupling between each data queue and an associated common ideal queue. This provides the continuous resynchronization of the input fields (whether in input or output channels) to each data queue and maintains the beneficial operation of the present invention system. It should be further noted that the use of a common ideal queue facilitates the synchronization of input and output data channels providing the above-described benefits of operation such as real-time editing and the like.

What has been shown and disclosed herein is a data synchronizing system for multiple memory arrays processing field organized data in which a plurality of data channels processing independent data are provided with data stream synchronizing systems which include a field organized data queue together with a field organized ideal queue. The data queue is configured to followed the ideal queue by creating input data fields in correspondence to the current input data field of the ideal queue. The selection of data and field rate for the system is provided by controlling the succession of fields within the ideal queue and allowing the data queue to follow the ideal queue.

While particular embodiments of the invention have been shown and described, it will be obvious to those skilled in the art that changes and modifications may be made without departing from the invention in its broader aspects.

That which is claimed is:

1. A data stream synchronizing system for use in processing a data stream organized into a plurality of fields, the data stream synchronizing system comprising:

a clock for providing field incrementing clock signals;

a synchronizing queue means for forming a first succession of first data fields by repetitively creating a first input data field and incrementally advancing each successively created first input data field through the synchronizing queue in response to each of the field incrementing clock signals;

a data queue means for forming a second succession of second data fields by repetitively creating a second input data field and incrementally advancing each successively created second data field through the data queue, each of the second input data fields being created in direct correspondence to a concurrent one of the first input data fields and each of the second input data fields having data received or assembled therein during the incremental advancing; and memory means for storing the data received in the second input data fields or retrieving the data assembled in the second input fields.

2. The data stream synchronizing system as set forth in claim 1 further including control means, responsive to a control signal, for selecting each first input data field from the plurality of fields in the data stream.

3. The data stream synchronizing system as set forth in claim 2 wherein each of the first input data fields includes a field number and a field rate.

4. The data stream synchronizing system as set forth in claim 3 wherein the control means selects the field number and the field rate in accordance with the control signal.

5. The data stream synchronizing system as set forth in claim 4 wherein the data stream is video data formed from data stored within the memory means and wherein the control signal is provided by a video user.

6. A method of synchronizing a data stream organized into a plurality of data fields, the method comprising the steps of:

providing periodic field clock signals;

forming a plurality of first data fields by repetitively creating a first data field in response to each of the field clock signals;

incrementally advancing each successively created first data field through a synchronizing queue in response to each of the field clock signals to form a succession of first data fields;

forming a plurality of second data fields, each second data field being formed in direct correspondence to the creation of a concurrent one of the first data fields;

incrementally advancing the second data fields through a second data queue in response to the field clock signals; and receiving or assembling selected portions of the data stream within the second data fields as the second data fields are incrementally advanced through the second data queue.

7. The method set forth in claim 6 wherein the steps of forming a plurality of first data fields and forming a plurality of second data fields each include establishing a queue having N fields.

8. The method set forth in claim 7 wherein the steps of incrementally advancing the plurality of first data fields and incrementally advancing the plurality of second data fields each include a step of outputting the Nth data field on each clock signal once each respective Nth data field is full.

9. The method set forth in claim 6 wherein the step of receiving or assembling includes the step of retrieving the selected portions from a memory.

10. The method set forth in claim 8 wherein the step of receiving or assembling the selected portions includes receiving the data stream from an external source and wherein the step of outputting the Nth data field includes storing the Nth data field in a memory.

11. The method set forth in claim 6 further including the step of receiving a control signal indicative of a data field output rate and wherein the step of forming a plurality of first data fields includes the steps of:

selecting a sequence of to-be-outputted data fields from the data stream in response to the control signal; and creating each one of the new first data fields in accordance with the selected sequence.

12. The method set forth in claim 11 wherein the control signal includes field rate and data stream location information.

13. A data stream synchronization system for use in processing a field-organized data stream in response to a control signal, the data synchronization system comprising:

a source of field clock signals;

a synchronizing queue for creating a plurality of input first data fields selected in response to the control signal and for incrementally advancing the plurality of input first data fields through the synchronizing queue in response to the field clock signals; and a data queue for receiving or assembling a plurality of data fields from the data stream by creating a plurality of input data fields in which each input data field is created in direct correspondence to the creation of one of a concurrent one of the input first data fields.

14. A data synchronizing system for synchronizing a data stream organized into a plurality of data fields, comprising:

means for providing periodic field clock signals;

means for creating a plurality of first data queue fields by creating a synchronizing queue data field in response to each of the field clock signals;

means for forming a synchronizing queue by incrementally advancing the synchronizing queue data fields in response to the field clock signals;

means for creating a plurality of data queue data fields, each of the data queue data fields corresponding to a concurrent one of the synchronizing queue data fields formed in the means for creating a synchronizing queue data field;

means for forming a data queue by incrementally advancing the data queue data fields in response to the field clock signals; and means for receiving or assembling selected portions of the data stream within each of the data queue data fields as the data queue is incremented.

15. The data synchronizing system set forth in claim 14 wherein the means for forming a synchronizing queue and the means for forming a data queue each include establishing a queue having N fields.

16. The data synchronizing system set forth in claim 15 wherein the means for incrementally advancing the synchronizing queue data fields and the means for incrementally advancing the data queue data fields each include means for outputting the Nth data field on each clock signal once each respective queue is full.

17. The data synchronizing system set forth in claim 14 wherein the means for assembling includes means for retrieving the selected portions from a memory.

18. The data synchronizing system set forth in claim 16 wherein the means for assembling includes means for receiving the data stream from an external source and wherein the means for outputting the Nth data field includes means for storing the Nth data field from the data queue in a memory.

19. The data synchronizing system set forth in claim 14 further including means for receiving a control signal indicative of a data queue output rate and wherein the means for forming a synchronizing queue include:

means for selecting a sequence of to-be-outputted data fields from the data stream in response to the control signal; and means for creating each one of the new synchronizing queue data fields in accordance with the selected sequence.

20. The data synchronization system set forth in claim 19 wherein the control signal includes field rate and data stream location information.

21. A method for synchronizing a data stream for use in processing a data stream organized into a plurality of fields, the method comprising the steps of:

receiving field incrementing clock signals;

repetitively creating a first input data field and incrementally advancing each successively created first input data field through a synchronizing queue in response to each of the field incrementing clock signals;

repetitively creating a second input data field and incrementally advancing each successively created second input data field through a data queue to form a second succession of second data fields each having received or assembled data therein, each of the second input data fields being created in direct correspondence to the first input data fields; and storing the received data in or retrieving the assembled data from a memory means.

22. A method for synchronizing a data stream for use in processing a field-organized data stream in response to a control signal, the method comprising the steps of:

providing field clock signals;

creating a succession of input first data fields in response to the field clock signals, each input first data field being selected in response to the control signal; and receiving or assembling a succession of input data fields from the data stream in which each input data field is created in direct correspondence to a simultaneously created one of the input first data fields.

23. The data stream synchronizing system as set forth in claim 5 wherein the memory means is a memory array.

24. A data stream synchronizing system for use in processing a data stream organized into a plurality of fields, the data stream synchronizing system comprising:

a clock for providing field incrementing clock signals;

a synchronizing queue for forming a first succession of first data fields by repetitively creating a first input data field and incrementally advancing each successively created first input data field through the synchronizing queue in response to each of the field incrementing clock signals;

a plurality of data queues which each form a second succession of second data fields by repetitively creating a second input data field and incrementally advancing each successively created second data field through that data queue, each concurrent one of the second input data fields within each of the data queues being created in direct correspondence to a concurrent one of the first input data fields and each of the second input data fields within each of the data queues having data received or assembled therein during the incremental advancing; and memory means for storing the data receiving in the second input data fields within each of the data queues or retrieving the data assembled in the second input data fields within each of the data queues.

25. A data stream synchronizing system as set forth in claim 16 further including means, operative upon the data queue, for inhibiting creation of the second data fields and incremental advance of the second data fields.

* * * * *